Jan. 3, 1950 C. L. HAYNES 2,493,404
EXPANSION JOINT
Filed Nov. 15, 1946 2 Sheets-Sheet 1
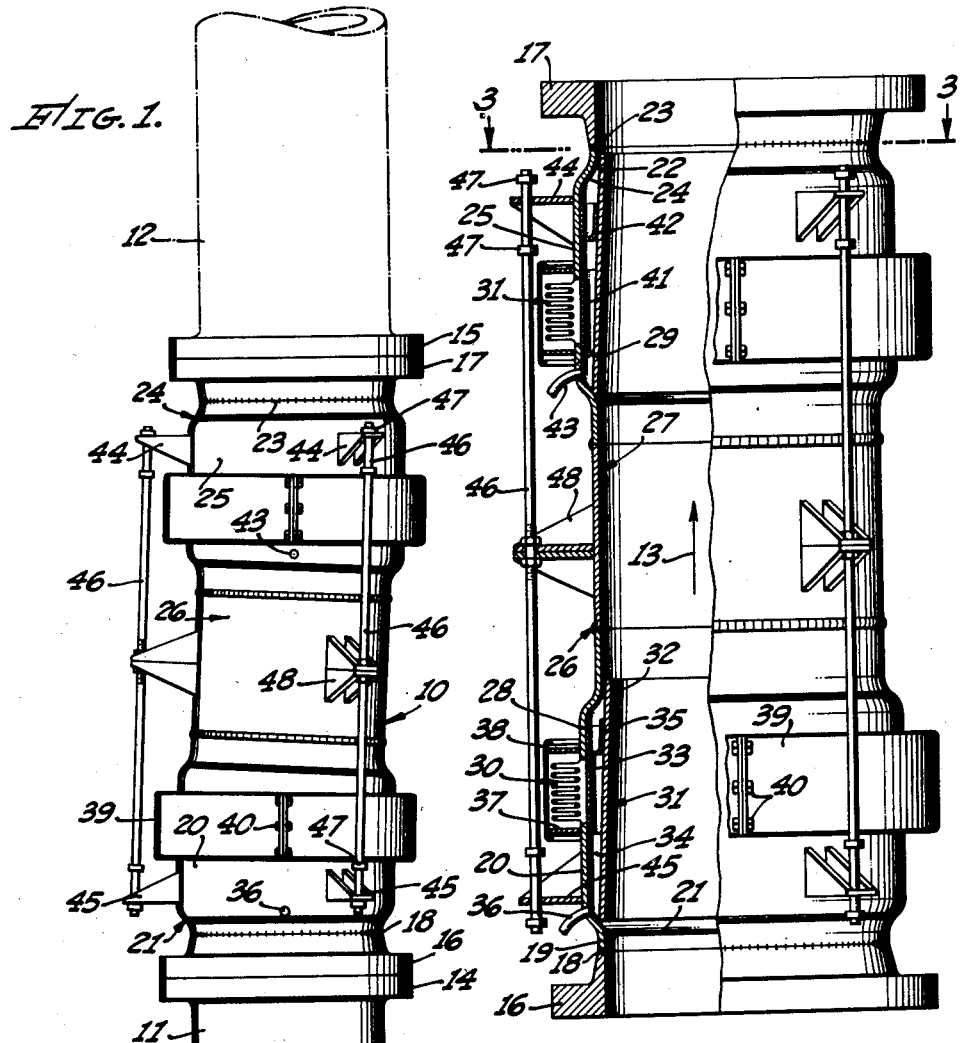
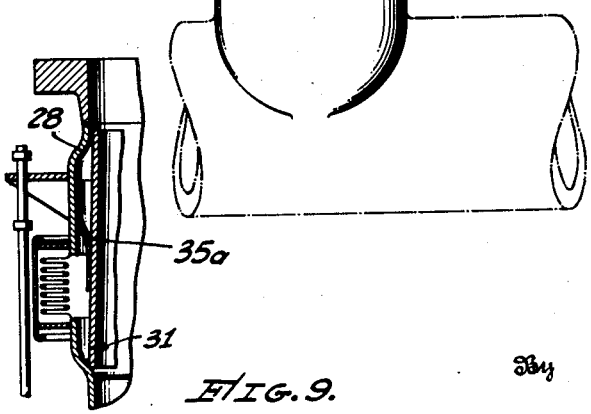
Inventor
CHARLES L. HAYNES.

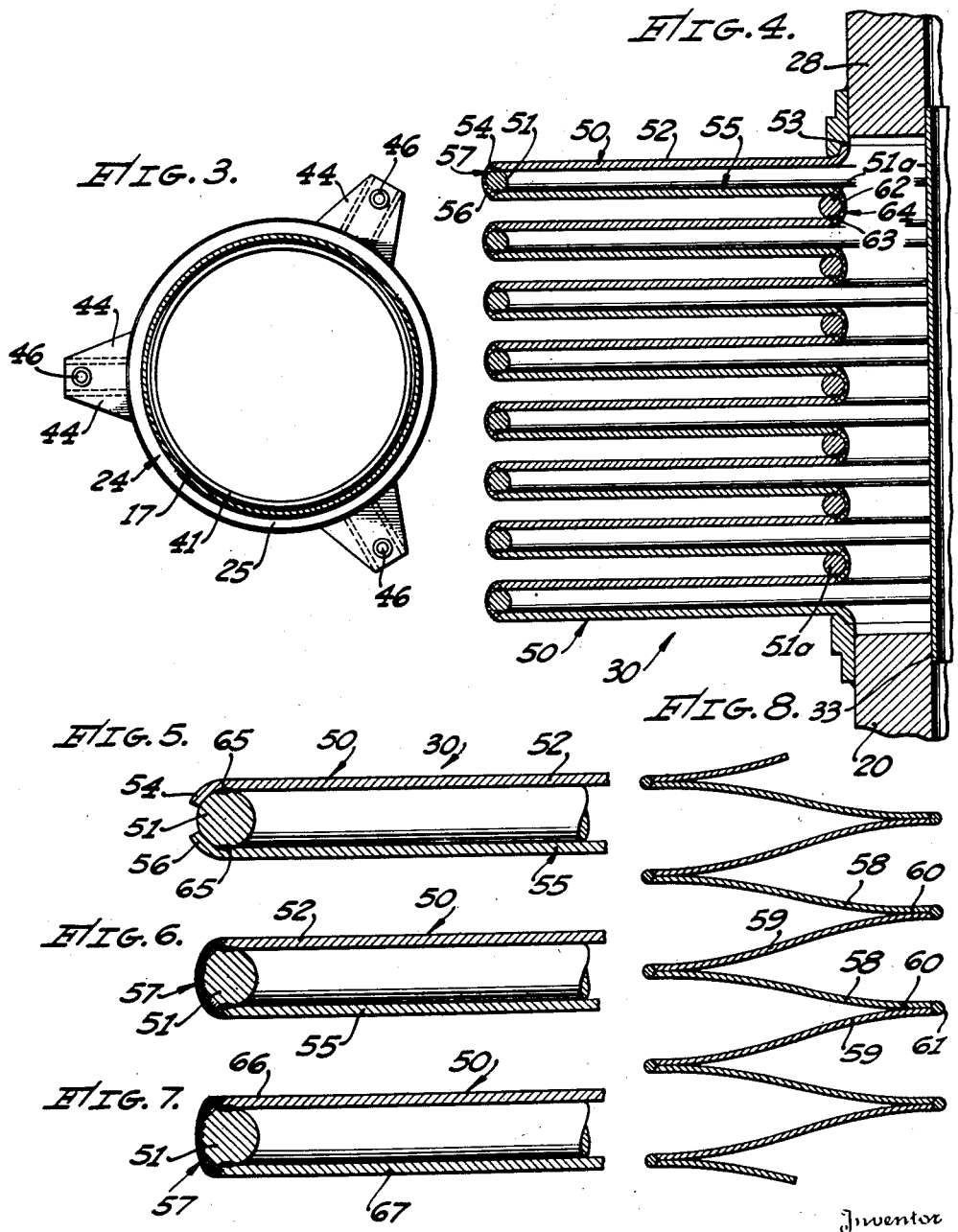

Patented Jan. 3, 1950

2,493,404

UNITED STATES PATENT OFFICE 2,493,404

EXPANSION JOINT

Charles L. Haynes, Flintridge, Calif., assignor to C. F. Braun & Co., Alhambra, Calif., a corporation of California Application November 15, 1946, Serial No. 710,022

11 Claims. (Cl. 285—90)

This invention relates to an expansion joint of the type commonly employed for connecting substantially aligned conduits and adapted to accommodate relative axial, lateral and angular movement of the conduits within the limits of the device.

This invention is particularly directed to an expansion joint for interposition between conduits employed for conveying fluids or gases under conditions of pressure and heat.

More particularly this invention will be described in connection with an expansion joint used in refinery apparatus and adapted for the transmission of highly abrasive catalyst particles in a catalytic cracking unit of the type used in the refining of gasoline. The problem encountered in connection with apparatus of this type is to provide an expansion joint between an inlet conduit and an outlet conduit which may have limited relative axial, angular and lateral motion by reason of expansion of the conduits or of other conduits to which they are connected. Furthermore the use of the conduits in carrying highly abrasive catalyst particles makes it imperative that a substantially full opening be provided through the expansion joint connecting the conduits and that substantially no projecting shoulders or sudden changes in passage area be presented.

It is therefore the principal object of my invention to provide an improved expansion joint of the type described capable of accommodating relative axial, angular and lateral movement of the conduits which it connects.

Another object is to provide an expansion joint of this type having substantially full openings therethrough and in which universally flexible bellows units are provided for accommodating said relative motions.

Another object is to provide a device of this type in which a conical shield is provided radially inwardly of the bellows units, which shield is sealed with respect to one of the non-flexible members and converges in the direction of fluid flow into telescopic relation with another of the non-flexible members.

Another important object of this invention is to provide an improved flexible bellows element for such an expansion joint, which element comprises a series of annular plates joined by welding at their inner and outer peripheries in a manner to avoid high stress concentration upon flexing of the plates in service.

Another object is to provide an improved bellows unit of this type in which the inner and outer edges of the annular plates are dished into curved surfaces to partially encircle a circular ring interposed between the plates; and integrally bonded by welding the edges of the plate and the adjoining surface of the ring.

Other objects and advantages will appear hereinafter.

Referring to the drawings:

Figure 1 is a side elevation of a preferred embodiment of my invention shown in operative position connecting to conduits which are axially misaligned.

Figure 2 is an elevation view partly in section showing details of construction on a larger scale.

Figure 3 is a sectional plan view taken substantially on the line 3—3 as shown in Figure 2.

Figure 4 is a partial sectional plan view showing details of construction of a preferred form of bellows unit embodying my invention.

Figure 5 is a partial sectional view on an enlarged scale showing assembly of the bellows plates and back-up ring before the final welding operation.

Figure 6 is a view simialr to Figure 5 showing the joint after the final welding operation.

Figure 7 is a partial sectional view of a modified form of joint.

Figure 8 is a partial sectional view similar to Figure 4 illustrating a conventional form of bellows unit which does not embody this invention.

Figure 9 is a sectional view showing a modified form of expansion joint chamber.

In the drawings, the expansion joint generally designated 10 may be interposed between the conduits 11 and 12 which are adapted to carry the catalyst in a direction shown by the arrow 13.

Flanges 14 and 15 of conventional design are provided on the conduits 11 and 12 respectively and are adapted to be connected with the corresponding flanges 16 and 17 by conventional means not shown. The flange 16 is integrally joined as by welding 18 to a conduit element 19 having a cylindrical wall 20 of larger diameter than the flange opening.

The members 16 and 19 form an integral conduit element hereinafter referred to as the inlet end member 21. Similarly at the other end of the expansion joint 10, the flange 17 is integrally joined to the member 22 as by welding 23 to form the discharge end member generally designated 24. The end member 24 likewise is provided with a cylindrical wall 25 of larger diameter than the flange opening. An intermediate conduit member 26 extends between the end members 21 and 24 and its central passage 27 is substantially equal to the full opening provided by the flanges 16 and 17.

Opposite ends of the intermediate member 26 are of large diameter to provide cylindrical walls 28 and 29. Means are provided for establishing a flexible yet fluid tight sealed connection between the opposed ends of the walls 20 and 28 and walls 25 and 29, and as shown in the drawings this means includes a pair of annular flexible bellows units generally designated 30 and 31. The manner in which these bellows units are secured to the opposing ends of the conduits 21, 27 and 24 is clearly shown in Figure 4.

Positioned radially inwardly of the cylindrical walls 20 and 28 is a frusto-conical shield 31. The large end of this shield is integrally joined to the member 19 within the flaring section leading to the cylindrical wall 20 in a manner so that substantially no restriction is presented to the flow of fluid and catalyst entering the expansion joint through the flange 16.

The opposite or small end 32 of the frusto-conical shield 21 extends into the bore 27 of the intermediate conduit 26 in telescopic relation and has radial clearance with respect thereto to accommodate the required degree of misalignment.

A baffle 33 may be secured as by welding to the cylindrical wall 28 and extends axially within the bellows unit 30 into telescopic relation within the cylindrical wall 20. The cylindrical walls 20 and 28 therefore cooperate with the shield 31 and baffle 33 to define a substantially annular chamber 34 encircling the shield 31.

Means are provided for preventing catalyst particles from settling into the annular chamber 34 as shown in the drawings. This means includes an annular flexible sealing element 35 secured within the cylindrical wall 28 and having sliding contact with the exterior surface of the shield 31. Any catalyst particles which succeed in entering the chamber 34 adjacent the small end 32 of the shield 31 are thereby prevented by the seal 35 from passing further into the chamber 34. Furthermore a purge connection 36 may be provided at the other end of the chamber 34 for introducing a fluid under pressure into the chamber and thereby effecting a flow of fluid axially through the annular chamber 34 past the seal means 35 and into the central passage 27.

The modified form of the device shown in Figure 9 employs a sealing element 35a which is not U shaped in cross section, but which is secured as by welding within the cylindrical wall 28 and has sliding contact with the exterior surface of the shield 31.

It will be understood that the construction just described is effective in preventing accumulation of catalyst particles within the annular chamber 34 to any extent where such accumulation might impede the ability of the expansion joint to accommodate relative axial movemeint of the conduits.

It will be further noted that the bellows unit 30 is positioned radially outward of the annular chamber 34 and that the bellows unit 30 is effectively isolated from any possible entry of catalyst into the spaces between the bellows plates.

Guard rings 37 and 38 are welded into position on opposite sides of the bellows unit 30 and a split cover 39 joined together by fasteners 40 may be employed for enclosing the bellows unit 30 and hence effectively exclude foreign matter therefrom.

The bellows mounting and annular chamber construction just described is substantially duplicated at the discharge end of the expansion joint 10. Thus a similar frusto-conical shield 41 is joined as by welding to the intermediate member 26 and converges into telescopic relation within the opening of end member 24.

The baffle 41, seal 42, purge connection 43 and enclosure for the bellows unit 31 are substantially the same as previously described in connection with the bellows unit 30 and therefore the description need not be duplicated here.

Means are provided for limiting relative axial movement between the end members 21 and 24. As shown in the drawings this means includes brackets 44 and 45 which are welded on the external surface of the cylindrical walls 20 and 25. Tie rods 46 provided with limit stops 47 at each end thereof are received by the brackets 45 and are centrally fixed on brackets 48 positioned midway of the intermediate conduit 26.

By referring to the drawings it will be apparent that the limit stops 47 cooperate with the brackets 44 and 45 to limit endwise movement of the end members 21 and 24 in both directions.

Bellows units 30 and 31 form an important part of the device embodying my invention and upon their successful operation depends the utility of the entire device.

As shown in Figures 4 to 7 these bellows units are preferably constructed in a manner to provide maximum flexibility consistent with high strength and long service life under operating conditions involving both heat and pressure. Each of the bellows units preferably comprise a series of co-axial annular plates 50.

Interposed between alternate pairs of plates are co-axial circular rings 51 and mounted in staggered relation with respect to the relatively large rings 51 are the relatively small rings 51a. The large rings 51 are positioned near the outer periphery of the plates 50 and the small rings 51a are postioned near the inner periphery of the plates.

The uppermost plate 52 is dished upwardly adjacent its inner edge 53 and is dished downwardly adjacent its outer peripheral edge 54. The curved portion 54 is adapted to partially encircle the ring 51 and to conform to the surface of the ring 51.

The second plate 55 is dished upwardly at its outer peripheral edge 56 to cooperate with the plate 52 in partially encircling the ring 51. The plates 52 and 55 and ring 51 may then be spot welded or seam welded at 65 by known resistance welding processes, in order to maintain the plates and ring in assembled relation preparatory to forming of the principal weld.

A circular deposit of weld metal is formed between the opposed edges 54 and 56 and integrally bonds the edges together and bonds them to the outer surface of the ring 51, as shown in Figure 6.

In the standard form of bellows of conventional construction shown in Figure 8, it has been found that flexing of the plates 58 and 59 produces a high concentration of stress in the vicinity of the notch 60 adjacent the weld deposit 61 along the outer edges of the plates 58 and 59. Repeated flexing of the plates 58 and 59 tends to propagate a crack in continuation of the notch 60 with the result that failure of the bellows units is to be expected after a relative short service life.

In my improved construction, however, the curved or dished edges of the annular plates lie against the surface of the circular ring interposed between them and the two plates and rings are subsequently joined integrally by the weld which lies principally in a plane normal to the axis of the bellows. This arrangement results in a superior construction which avoids the high stress concentration present in the conventional device shown in Figure 8.

The relatively small rings 51a interposed between the annular plates adjacent their inner peripheries are welded to the edges of the plates in substantially the same manner described for the outer rings 51. The dished edges 62 and 63 are integrally united with the ring 52 by the weld 64.

The modified form of joint shown in Figure 7 illustrates the final appearance after fusing the ring 51 to plates 66 and 67 which were not crimped nor dished prior to welding.

After the annular plates have been integrally joined to themselves and to the rings by fusion welding, the structure is preferably given a stress relieving operation in order to leave the unit in a stress free condition at the time of its assembly into an expansion joint. If desired, the bellows unit may be placed in the stress relieving furnace in a condition corresponding to its fully extended position. If such procedure is followed, the total movement of the bellows in the compressive direction acts to increase the tension stress at the outer edge of the welds and there is therefore little possibility of propagating a crack radially outwardly through the welded joints at the rings 51 or radially inwardly through the welded joints through the rings 52.

Having fully described the preferred embodiments of my invention, I am not limited to any of the details of description herein set forth except as described in the following claims.

I claim:

1. A fluid conducting expansion joint adapted to accommodate limited axial, angular or lateral movement between ends of substantially aligned inlet and outlet conduits, having in combination end members adapted to be secured to the inlet conduit and the outlet conduit respectively, an intermediate conduit operatively positioned between said end members, the passage through the intermediate conduit being substantially equal to the full opening of the inlet and outlet conduits, separate means connecting each end member to one end of said intermediate member respectively, each of said means including cylindrical housings at the opposed ends of said members of substantially larger diameter than said openings, annular flexible bellows joining the opposed ends of said housings in fluid tight relation, an annular baffle extending between the opposed ends of the housings radially inwardly of the bellows, a frusto-conical shield fixed at its upstream end relative to one of the members within the cylindrical housing and converging downstream in telescopic relation into the other of said members, the shield cooperating with said housings and baffle to define a substantially annular chamber encircling the shield, and means in said chamber adapted to exclude foreign matter therefrom.

2. A fluid conducting expansion joint adapted to accommodate limited axial, angular or lateral movement between ends of substantially aligned inlet and outlet conduits, having in combination end members adapted to be secured to the inlet conduit and the outlet conduit respectively, an intermediate conduit operatively positioned between said end members, the passage through the intermediate conduit being substantially equal to the full opening of the inlet and outlet conduits, separate means connecting each end member to one end of said intermediate member respectively, each of said means including cylindrical housings at the opposed ends of said members of substantially larger diameter than said openings, annular flexible bellows joining the opposed ends of said housings in fluid tight relation, baffle means extending between ends of the members radially inwardly of said bellows, a frusto-conical shield fixed at its upstream end relative to one of the members within the cylindrical housing and converging downstream in telescopic relation into the other of said members, the shield cooperating with said housings and baffle means to define a substantially annular chamber encircling the shield, and purge means adapted to maintain a flow of fluid axially through said annular chamber.

3. A fluid conducting expansion joint adapted to accommodate limited axial, angular or lateral movement between ends of substantially aligned conduits of similar size, comprising in combination cylindrical walls on opposing ends of said conduits of substantially larger diameter than the conduits, an annular flexible bellows joining the opposed ends of said cylindrical walls in fluid tight relation, a frusto-conical shield fixed at its upstream end relative to one of the conduits within the cylindrical wall and converging downstream in telescopic relation into the other of said members, baffle means encircling the shield and extending between the ends of the members, the shield, cylindrical walls and baffle cooperating to define a chamber, and purge means adapted to maintain a flow of fluid axially through said annular chamber.

4. A fluid conducting expansion joint adapted to accommodate limited axial, angular or lateral movement between ends of substantially aligned inlet and outlet conduits, having in combination end members adapted to be secured to the inlet conduit and the outlet conduit respectively, an intermediate conduit operatively positioned between said end members, the passage through the intermediate conduit being substantially equal to the full opening of the inlet and outlet conduits, separate means connecting each end member to one end of said intermediate member respectively, each of said means including cylindrical housings at the opposed ends of said members of substantially larger diameter than said passage, stop means including an element on each of the end member housings adapted to limit axial movement of the end members, annular flexible bellows joining the opposed ends of said housings in fluid tight relation, an annular baffle extending between the opposed ends of said housings radially inwardly of the bellows, a frusto-conical shield fixed at its upstream end relative to one of the members within the cylindrical housing and converging downstream in telescopic relation into the other of said members, the shield cooperating with said housings and baffle to define a substantially annular chamber encircling the shield, and means in said chamber adapted to exclude foreign matter therefrom.

5. An annular bellows for an expansion joint, having in combination a pair of coaxial annular plates, a circular ring positioned between the plates coaxially thereof adjacent their outer peripheral edges, the outer edge of each plate being dished to provide a curved surface conforming to a portion of the surface of the circular ring, the dished edges of the plates cooperating to partially encircle the ring, and weld means integrally joining the outer edges of the plates and the outer surface of the ring in sealed relation.

6. An annular bellows for an expansion joint, having in combination a pair of coaxial annular plates, a coaxial circular ring positioned between the plates adjacent their inner peripheral edges, the inner edge of each plate being dished to provide a curved surface conforming to a portion of the surface of the circular ring, the dished edges of the plates cooperating to partially encircle the ring, and weld means integrally joining the inner edges of the plates and the inner surface of the ring in sealed relation.

7. An expansible bellows having an annular plate, a small circular coaxial ring on one side of the plate adjacent its inner periphery, a large circular coaxial ring on the other side of the plate adjacent its outer periphery, the outer edge of the plate being dished to provide a curved surface conforming to a portion of the surface of the large ring, the inner edge of the plate being dished to provide a curved surface conforming to a portion of the surface of the small ring, weld means integrally joining the outer edge of the plate to the outer surface of the large ring, and weld means integrally joining the inner edge of the plate to the inner surface of the small ring.

8. An annular bellows for an expansion joint comprising in combination a series of annular plates coaxially arranged, a series of relatively large diameter circular rings interposed between alternate pairs of plates adjacent their outer peripheries, a series of relatively small diameter circular rings in staggered relation with the first series and interposed between alternate pairs of plates adjacent their inner peripheries, the outer edge of each plate being curved in one direction to partially encircle one of the large rings and the inner edge being curved in the other direction to partially encircle one of the small rings, weld means integrally joining the outer curved edges of the plates with the outer surface of the large rings, and weld means integrally joining the inner curved edges of the plates with the inner surface of the small rings.

9. An annular bellows for an expansion joint comprising in combination a series of annular plates coaxially arranged, a series of relatively large diameter circular rings interposed between alternate pairs of plates adjacent their outer peripheries, a series of relatively small diameter circular rings in staggered relation with the first series and interposed between alternate pairs of plates adjacent their inner peripheries, a fusion weld deposit encircling each of the large diameter rings and integrally joining the outer edges of the plates, and a fusion weld deposit on the inner surface of the large diameter rings integrally joining the inner edges of the plates.

10. An annular bellows for an expansion joint comprising in combination a series of annular plates coaxially arranged, a series of relatively large diameter circular rings interposed between alternate pairs of plates adjacent their outer peripheries, a series of relatively small diameter circular rings in staggered relation with the first series and interposed between alternate pairs of plates adjacent their inner peripheries, the large diameter rings being integrally joined to the adjacent outer edges of the plates by a continuous fusion weld, and the small diameter rings being integrally joined to the adjacent inner edges of the plates by a continuous fusion weld.

11. A fluid conducting expansion joint adapted to accommodate limited axial, angular or lateral movement between ends of substantially aligned inlet and outlet conduits, having in combination end members adapted to be secured to the inlet conduit and the outlet conduit respectively, an intermediate conduit operatively positioned between said end members, the passage through the intermediate conduit being substantially equal to the full opening of the inlet and outlet conduits, separate means connecting each end member to one end of said intermediate member respectively, each of said means including cylindrical housings at the opposed ends of said members of substantially larger diameter than said openings, annular flexible bellows joining the opposed ends of said housings in fluid tight relation, a frusto-conical shield fixed at its upstream end relative to one of the members within the cylindrical housing and converging downstream in telescopic relation into the other of said members, means including a split guard ring forming an enclosure for said bellows, said means also including an annular baffle extending between the opposed ends of the housing radially inwardly of the bellows and encircling the shield.

CHARLES L. HAYNES.

REFERENCES CITED

The following references are of record in the file of this patent:

UNITED STATES PATENTS

| Number | Name | Date |
|---|---|---|
| 1,565,374 | Kramer | Dec. 15, 1925 |
| 1,717,196 | Emmet | June 11, 1929 |
| 1,726,483 | Giesler | Aug. 27, 1929 |
| 1,821,274 | Plummer | Sept. 1, 1931 |
| 2,323,985 | Fausek et al. | July 13, 1943 |
| 2,337,038 | Fentress | Dec. 21, 1943 |
| 2,370,304 | Grant | Feb. 22, 1945 |
| 2,414,159 | Modine | Jan. 14, 1947 |